Sept. 20, 1966  M. GOODMAN  3,273,683
AUTOMATIC PARKING AREA MECHANISM
Original Filed Oct. 8, 1962  2 Sheets-Sheet 1

INVENTOR.
MORRIS GOODMAN
BY
Hood, Gust & Irish
Attorneys

Sept. 20, 1966     M. GOODMAN     3,273,683

AUTOMATIC PARKING AREA MECHANISM

Original Filed Oct. 8, 1962     2 Sheets-Sheet 2

INVENTOR.
MORRIS GOODMAN
BY
Hood, Gust & Irish
Attorneys

United States Patent Office 3,273,683
Patented Sept. 20, 1966

3,273,683
AUTOMATIC PARKING AREA MECHANISM
Morris Goodman, 30 W. Court St., Indianapolis, Ind.
Original application Oct. 8, 1962, Ser. No. 229,082, now Patent No. 3,241,755, dated Mar. 22, 1966. Divided and this application Mar. 9, 1966, Ser. No. 532,959
8 Claims. (Cl. 194—4)

The present application is a division carved from applicant's copending application Serial No. 229,082, filed October 8, 1962, now Patent No. 3,241,755 for Automatic Parking Area Mechanism, in accordance with the examiner's final requirement.

The present invention relates to the token reading and vehicle releasing mechanism of a system of the character disclosed in said copending application, and its primary object is to provide automatic means, dominated by a previously-issued token of peculiar, predetermined configuration for calculating the elapsed time between issuance of the token and the introduction of that token into the calculating means. Obviously, such a calculating means may be so constructed as to indicate the fee to be collected, based upon any predetermined unit of charge per unit of time.

Another object of the invention is to provide, in association with such calculating means, coin-actuated means for clearing such calculating means for reception of another token and for removing a barrier means to permit a single vehicle to leave the parking area.

Further objects of the invention will appear as the description proceeds.

To the accomplishment of the above and related objects, my invention may be embodied in the form illustrated in the accompanying drawings, attention being called to the fact, however, that the drawings are illustrative only, and that change may be made in the specific construction illustrated and described, so long as the scope of the appended claims is not violated.

Figure 1:
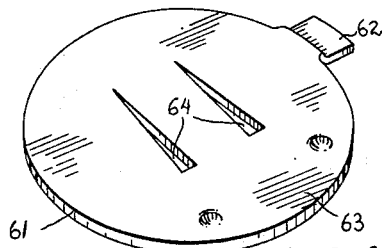
FIG. 1 is an enlarged, bottom perspective view of a form of token, issued by mechanism disclosed in said copending application and adapted to be read by the device of the present application.
Figure 2:
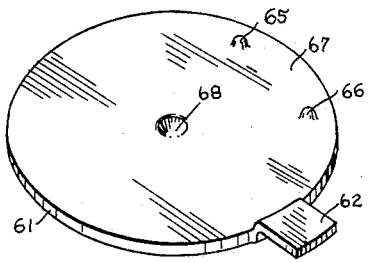
FIG. 2 is a similar, top perspective of such a token.
Figure 3:
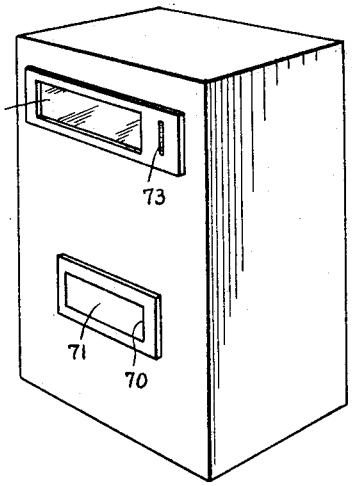
FIG. 3 is a reduced perspective view of a housing in which the token-actuated fee-calculating mechanism may be enclosed.

According to the disclosure of said copending application, a token 61 formed from electrically-conductive material will normally be issued by mechanism 22 situated conveniently adjacent a barrier 160 at the entrance to parking area 161, whenever a vehicle is driven onto treadle 159; and when that token is accepted by the vehicle operator, the barrier 160 will be moved out of barring position. FIGS. 1 and 2 illustrate a typical form of such a token.

As shown, the token 61 will be generally discoid, and its bottom face 63 will be formed with orienting indentations 64. A tongue or tab 62 will extend substantially radially from the periphery of the token 61 and will be somewhat offset from the plane of the top face 67 of the token. The top face 67 of the token will be formed with two bumps 65 and 66, spaced apart by $\frac{1}{7}$ of 360°. As is explained in said copending application, the relationship of the bumps 65 and 66 to the orienting indentations 64 identifies the day of the week, and the relationship of the tab 62 to the orienting indentations 64 identifies the hour of the day at which that token was issued.

Figure 6:
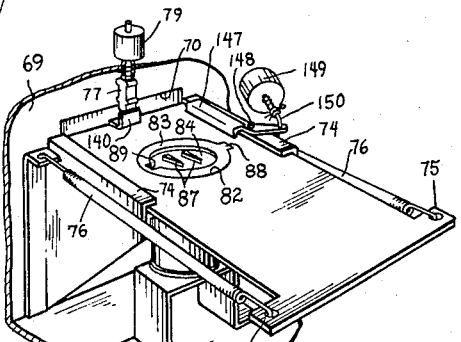
FIG. 6 is a top perspective view of the token-receiving slide and the clearing means therefor, looking from the inside of the housing toward the front wall thereof.
Figure 5:
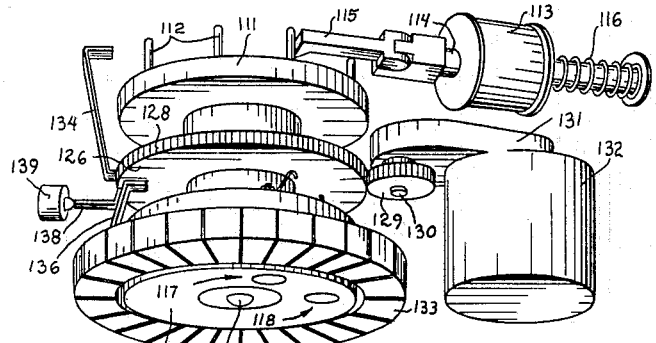
FIG. 5 is a perspective view of the token-sensing mechanism and the time-controlled drive means therefor.
Figure 7:
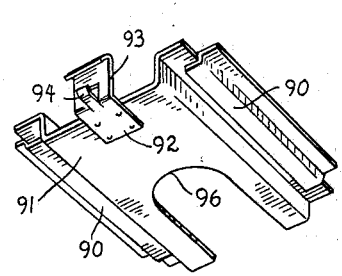
FIG. 7 is a bottom perspective view of an auxiliary slide which is associated with the token-receiving slide, looking rearwardly from the front end thereof.

Referring now particularly to FIGS. 3 to 7, it will be seen that I have illustrated a case or housing 69 formed to provide a port 70 through which protrudes a slide 71. The case is formed to provide, as well, a window 72 for a purpose later to be described, and a coin slot 73. The slide is mounted for reciprocation in guideways 74 and, as is most clearly shown in FIG. 6, is provided near its rear end with laterally projecting ears 75 to which are connected coiled springs 76, anchored on the housing wall, and continually urging the slide 71 forwardly or outwardly. A latch bolt 77 is reciprocably mounted in a guide 78 and normally is engaged behind a suitable tongue 140 carried by the slide 71 to retain said slide in the position illustrated in FIGS. 4 and 6. The latch bolt 77 is carried by the armature 80 of a solenoid 79 in such fashion that, when the solenoid 79 is energized, the latch bolt will be withdrawn to permit the springs 76 to project the slide forwardly to expose a significant portion of its length outside the case 69. Spring means 81 will return the armature 80 upon deenergization of the solenoid 79; and switch means (not shown) dominated by a treadle 163 or other device sensitive to the presence of a vehicle approaching the exit from the parking area, will momentarily energize the solenoid 79 when a vehicle is driven into predetermined proximity to such exit.

The slide 71 is formed to provide a well 82 opening through its upper surface; and loosely seated in said well is a dielectric socketed member 83 whose vertical height is equal to the depth of the well 82. A reciprocable platform element 84 is loosely seated in the socket of the member 83 and includes a depending shank 85 penetrating a perforation 86 in the floor of the member 83. The uppermost face of the element 84 is formed with a pair of ribs 87, and means, such as the feathered connections 88 and 89 are provided to maintain proper orientation between the member 83 and the slide 71 and between the element 84 and the member 83.

Rails 90 are secured to the bottom surface of the slide 71, and an auxiliary slide 91 is supported therefrom for longitudinal movement relative to said slide 71. A leaf 92 of resilient material is suitably secured to the auxiliary slide near the forward end thereof and includes an upwardly-extending portion 93 disposed ahead of the forward end of the auxiliary slide and smoothly rebent at its upper end, as is most clearly shown in FIG. 4, and a forwardly-extending portion 94 which is cammed at its distal end. The lower surface of the slide 71 is formed with a notch or depression 95, as shown, for a purpose which will appear.

At its rear end, the auxiliary slide 91 is cut away as at 96 to straddle, at times, the head 97 of the armature 98 of a solenoid 99. Said head 97 is aligned with a port 100 in the floor of the well 82 when the slide 71 is in the position of FIG. 4, and so is in cooperative registry with the member 83; and said head is formed with an axial socket 101 which, at such times, registers with the shank 85.

When the solenoid 79 is momentarily energized to retract the latch bolt 77 from engagement with the tongue 140, the springs 76 will, as described above, project the slide 71 to a position in which the well 82 is wholly disposed forwardly beyond the front wall of the housing 69. Engagement of the leaf portion 94 with the housing wall will restrain the auxiliary slide 91 against entrainment with that forward movement until the forward wall of the well 82 comes into engagement with the leaf portion 93 and the distal end of that portion drops into the depression 95. As the slide 71 starts its forward movement, the bevelled surface 102 of the shank 85 coacts with the correspondingly bevelled mouth of the socket 101 to lift the element 84 to a level at which the ribs 87 project above the plane of the top surface of the slide 71. As the shank 85 moves out of engagement with the upper end of the head 97, it will be supported in such elevated position by the auxiliary slide 91; and it is only after the shank has been moved onto said auxiliary slide that said auxiliary slide will be entrained with the further forward movement of the slide 71.

Now, a token 61 may be placed on the slide 71, with the ribs 87 received in the sockets 64, whereby the token is properly oriented on the slide. The customer will then press the slide 71 home, against the tendency of the springs 76, until the tongue 140 cams it way past the latch bolt 77 to the position of FIG. 4. As the shank 85 approaches registry with the head 97, the base of the cut-out 96 in the auxiliary slide 81 comes into engagement with said head, just as the leaf portion 94 attains its position illustrated in FIG. 4, and movement of the auxiliary slide 91 is arrested while rearward movement of the slide 71 continues until the shank 85 registers with the socket 101 and the platform 84 drops to leave the token supported solely on the slide 71 and the member 83.

Upon a perforated plate 103, spaced slightly above the slide 71 and which may be integral with the guide 78, is stationarily mounted, concentrically with respect to the armature head 97, a retainer 104 for a contactor ring 133 which will hereinafter be described in detail. A block 105 of dielectric material, formed with a bore 106 therethrough, is suitably supported from a shelf 107 and provides support for a stationary metal post 108, the lower end of which extends to a level slightly below the level of the bottom surface of the contactor ring 133, is concentric with the shank 85, and may preferably be provided with a knob 109 adapted to seat in the depression 68 of a token.

Journalled on the post 108 for rotation with respect thereto is a rotor 110 of dielectric material, the lowermost face of said rotor being disposed in a plane just below that of the ring 133. A wheel 111 of dielectric material is fixedly secured to said rotor 110 near the upper end theerof and carries a series of seven equiangularly-spaced pins 112.

Suitably mounted near the wheel 111 is a solenoid 113 whose armature 114 carries a pawl 115 cooperable with the pins 112. Each energization of the solenoid 113 will advance the armature 114, whereby the pawl 115, acting upon one of the pins 112, will turn the wheel 111 and rotor 110 through 1/7 of a revolution. Spring means 116 is provided for returning the armature 114 to retracted position, the pawl 115 camming past the next pin 112 to engage therewith for rotor actuation upon the next energization of the solenoid 113.

Figure 8:
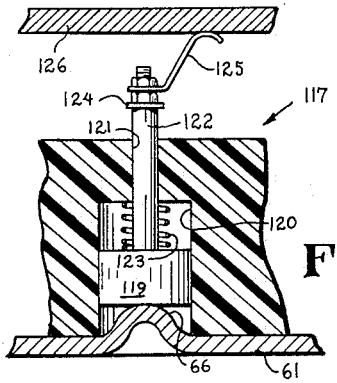
FIG. 8 is an enlarged, vertical section showing the construction of one of a plurality of day-reading switches or feeler assemblies which are incorporated in the calculating mechanism.

Two feeler assemblies 117 and 118 are carried by the rotor 110. These assemblies are identical and are identically supported; and therefore only one has been illustrated in detail in FIG. 8 and will be described. The assembly 117 comprises a plunger head 119 reciprocably supported in a socket 120 opening through the bottom face of the rotor 110 and having a reduced extension 121 accommodating a stem 122. A spring 123 is sleeved on said stem and is confined between said plunger head and the roof of the socket 120, stop means 124 being carried on said stem whereby the assembly 117 is resiliently held with the bottom face of said plunger head flush with the bottom face of the rotor 110. At its upper end, the assembly 117 carries a spring contact finger 125 which, when the plunger is raised as shown in FIG. 8, makes electrical contact with a conductive collar 126 which is journalled on the rotor 110 near its upper end.

The socket 120 and its analog are radially spaced from the axis of the post 108 a distance equal to the distance between the depression 68 of a token and each of the protuberances 65 and 66.

The collar 126 carries a peripheral series of teeth 128 with which meshes a pinion 129 on the output shaft 130 of transducer mechanism 131, driven by a clock type motor 132 so that the operation of the collar 126 is absolutely synchronized with the timer mechanism of the token-issuing mechanism 22. A brush 134 connected to a lead 135 bears continuously on the collar 126, and said collar further carries a brush 136 which moves with the collar 126 in continuous electrical contact with the ring 133. A lead 137 is connected to post 108.

A dielectric finger 138 is carried by the collar 126 at a level such as operatively to engage the actuator of a switch 139 once upon each revolution of said collar; and movement of said actuator by said finger momentarily energizes solenoid 113 to advance rotor 110 by 1/7 of a revolution.

Figure 9:
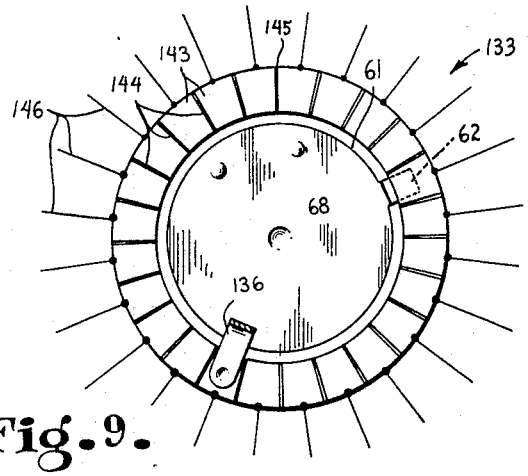
FIG. 9 is an enlarged, somewhat diagrammatic view of a time reading device, showing a token in cooperative association therewith.
Figure 10:
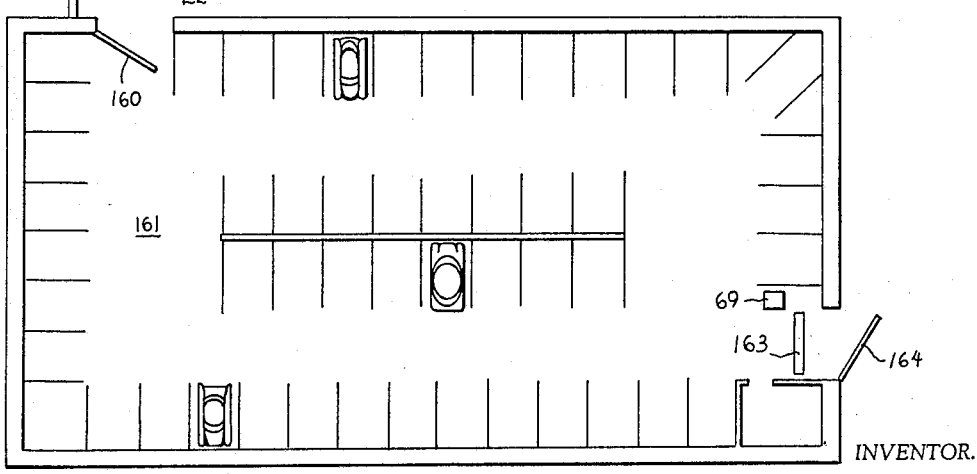
FIG. 10 is a diagrammatic plan of a parking area controlled by the mechanisms contemplated in the present disclosure.

As is most clearly illustrated in FIG. 9, the contactor ring 133 is made up of a series of conductor pads 143. In the illustrated embodiment of the invention, there are twenty-four such pads separated by rectifier wafers 144 which are characterized by the fact that they permit current flow therethrough in one direction only. An insulator 145 is inserted between the first conductor pad and the twenty-fourth conductor pad. A lead 146 extends from each conductor pad.

*Operation*

After a patron has parked his vehicle within the area 161, he takes his token with him and goes about his business. While he is gone, of course, the collar 126 will advance, step-by-step, as described above, thus moving the brush 135 from pad to pad on the ring 133. If the driver returns on the same day, the rotor 110 will not have moved.

Other barrier means 164 guards the exit from the parking area and a unit 69 is conveniently mounted adjacent thereto. When he is ready to withdraw his vehicle from the area, he drives it into predetermined proximity to the exit barrier 164 where vehicle-sensitive means such as, for instance, the treadle 163 will energize the solenoid 79 to retract the latch 77 and the springs 76 will project the slide 71 and the driver will place his token on the slide. In order to permit the token to be carried into the case 69 by the slide, the token must be so arranged that the ribs 87 are received in the orienting indentations 64; and thereby the bumps 65 and 66 will be properly oriented relative to the feelers 117 and 118 and the tab 62 will be properly oriented relative to the ring 133 to correspond with the day and hour when the token was issued. The patron now pushes the slide 71 as far as possible to the rear in the housing 69, and the rear end of the slide engages and moves the actuator of a switch 158. As explained above, such movement of the slide 71 will bring the parts into the relationship illustrated in FIG. 4 in which platform element 84 has dropped away from the token 61. Actuation of switch 158 closes an energizing circuit for solenoid 99 whereby its armature 98 is lifted. Head 97 thus engages and lifts member 83 to press the top face 63 of the token 61 against the bottom face of the rotor 110, the protuberance 109 at the bottom of the post 108 entering the indentation 68 to make electrical contact with the token.

If the token is one which has been issued on the same day, the feeler assembly 117 will be in registry with the bump 66 on the token and the feeler assembly 118 will be in registry with the bump 65, and the bumps will engage the heads 119 of both assemblies to lift their contact fingers 125 into electrical contact with the collar 126. One type of circuit to a suitable computer mechanism (not shown) is thus closed through the lead 137, post 108, the token, the two contact fingers 125, the collar 126, the brush 134 and the lead 135; and the computer will thus sense the fact that the parking fee to be collected will be for less than one full day. If, however, the solenoid 113 has been energized since issuance of the token, the rotor 110 will have been moved through one step so that the feeler 118 will register with the bump 66 and the feeler 117 will not register with a bump. Thus, a different kind of circuit to the computer will be closed and the computer will sense the fact that a charge for one full day's parking must be added to the hourly charge. If, however, the solenoid 113 has been energized twice since issuance of the token, neither feeler 117 or 118 will register with a bump and no circuit will be closed through either feeler assembly, whereby the computer will sense the fact that the charge must be for more than two full days of parking. The computer will be so constructed that, under such circumstances, it will cause a legend to appear in the window 72 requiring the patron to refer his token to an attendant, and the mechanism will be so affected that the barrier 164 against removal of the vehicle from the parking area will not be withdrawn except by manual control under the supervision of an attendant.

When the token 61 is pressed into contact with the rotor 110, the offset tab 62 makes electrical contact with one of the pads 143. At the same time, the brush 136 will be in electrical contact with another of the pads 143, depending upon the time which has elapsed since the issuance of the token. The condition illustrated in FIG. 9 indicates that the token was issued between four and five o'clock a.m. and that it has been introduced into the calculating mechanism between one and two o'clock p.m. Thus, when the token is lifted as above described, a circuit will be closed from the lead 135 through the brush 134, the sleeve 126, the brush 136 and in a counter-clockwise direction through the contactor pads 143 and the rectifier wafers 144 to the tab 62, thereby affecting the computer, through the leads connected to the pads respectively contacted by the brush 136 and the tab 62, to calculate the parking fee for nine hours and display a legend, indicating that fee, through the window 72.

Now, when the proper amount of the fee is deposited in the coin slot 73, suitable mechanism will cause the exit barrier 164 to be withdrawn, whereby the vehicle may be driven away.

Figure 4:
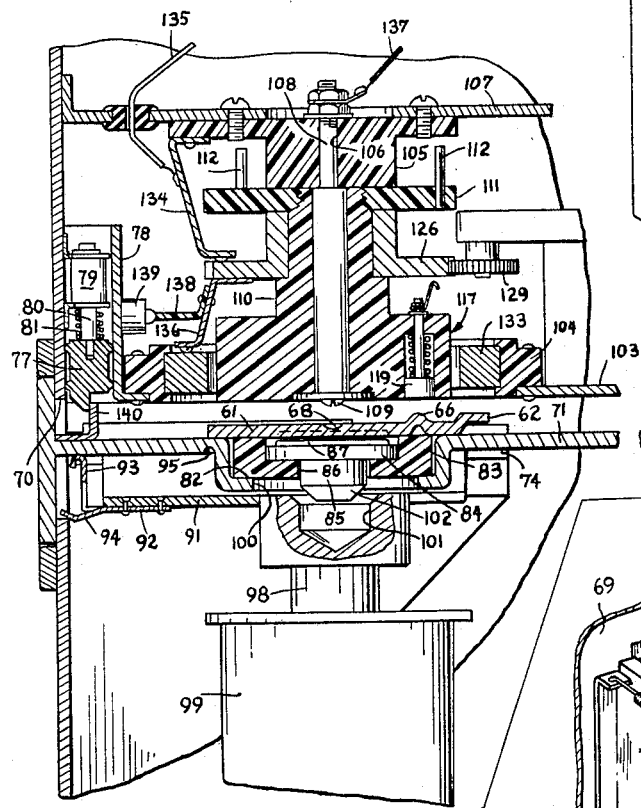
FIG. 4 is a broken, vertical section through such mechanism, showing the parts in their positions assumed when a token to be read has been situated on the slide and the slide has just been pressed home to energize the reading mechanism.

At the same time, the solenoid 99 will be deenergized and the head 97 will return to the retracted position of FIG. 4, wherein the token 61 rests solely on the slide 71 and the plane upper surface of the member 83, the platform element 84 being in its lowermost position, as shown. As is illustrated in FIG. 6, a lever 147 is pivoted at 148 on one of the guideways 74, and a solenoid 149 has its armature 150 operatively connected to one arm of said lever. When the plunger head 97 reaches its illustrated position, it actuates a switch (not shown) which momentarily energizes solenoid 149 to swing the lever 147 in a counter-clockwise direction. Said lever is so proportioned and arranged that, as it so swings, it sweeps across the well 82, striking the token 61 and driving it past the rear end of the other guideway 74 and so off the slide 71 into a waste receptacle (not shown), thus clearing the slide for the reception of a token from the next patron who desires to remove his vehicle from the area.

As disclosed in said copending application, each actuation of the token-issuing mechanism 22 may preferably actuate the plus side of a counter device 162. In a similar manner, retraction of the plunger head 97 may actuate the minus side of such a counter. Thus, as vehicles enter the parking area, the token-issuing mechanism 22 counts them, while the token-reading mechanism 69 at the exit from the area counts departing vehicles, so that such counter mechanism 162 will at all times maintain a "memory" of the number of vehicles currently within the area. When the conjoint action of the token-issuing and token-reading mechanisms has told the counter device that the number of vehicles currently in the area equals the capacity of the area, suitable means (not shown) may be actuated by such device to render the token-issuing mechanism 22 temporarily inoperative and to display a notice or "LOT FULL" sign 165, adjacent the area entrance, that the parking area is full. Upon the subsequent actuation of the exit barrier retraction mechanism, the counter device will actuate said means to obscure such notice and to render the token-issuing mechanism again operative.

The several devices which are indicated diagrammatically or mentioned hereinabove as cooperable with, or actuated by, the mechanism illustrated in the drawings forming a part of this disclosure, but which devices are not representationally illustrated in those drawings, are all available on the commercial market and are known to, and understood by, persons ordinarily skilled in the art to which the present invention pertains.

I claim as my invention:

1. Means for reading a discoid, electrically-conductive token having an orienting depression in one face and having a radial tab, comprising a housing, a slide having an upwardly-presented surface formed with a well therein, said slide being supported for movement between an outer position in which said well is exposed outside said housing and an inner position in which said well is disposed wholly within said housing, a dielectric element loosely received in said well, a platform member movably supported relative to said dielectric element and formed to provide an upwardly-presented surface having an upward orienting projection, means supported from said slide and cooperating with said platform member, when said slide is in its outer position, to support said platform member with its said surface substantially flush with said slide surface to receive a token with said upward orienting projection entered in said orienting depression, a contactor ring mounted in said housing above said slide and concentrically registering with a token supported on said slide when said slide is in its inner position, means in said housing and engageable with said dielectric element, when said slide is in its inner position, to lift said dielectric element to move the tab of a token supported thereon into electrical contact with said ring, said ring being made up of a series of conductor pads separated by rectifier wafers, a collar concentric with said ring and mounted for rotation about the axis of said ring, a brush carried by said collar to sweep said ring, and means for rotating said collar step-by-step to move said brush, at predetermined uniform time intervals from one pad to the next and to turn said collar through one complete revolution in twenty-four hours.

2. Means for reading a discoid, electrically-conductive token having an orienting depression in one face, having a protuberance from its opposite face at a point radially spaced from the center of said token and having a radial tab, comprising a housing, a slide having an upwardly-presented surface formed with a well therein, said slide being supported for movement between an outer position in which said well is exposed outside said housing and an inner position in which said well is disposed wholly within said housing, a dielectric element loosely received in said well, a platform member movably supported relative to said dielectric element and formed to provide an upwardly-presented surface having an upward orienting projection, means supported from said slide and cooperating with said platform member, when said slide is in its outer position, to support said platform member with its said surface substantially flush with said slide surface to receive a token with said upward orienting projection entered in said orienting depression, an electrically conductive post in said housing above said slide and concentrically registering with a token supported on said slide when said slide is in its inner position, a dielectric rotor supported from said post for rotation about the axis of said post, an electrically-conductive collar mounted within said housing for rotation, independently of said rotor, about the axis of said post, an electrically conductive feeler reciprocably carried by said rotor at a point radially spaced from said axis by a dimension equal to the spacing of said protuberance from the center of said token and movable, at times, by engagement of said protuberance therewith, contact means carried by said feeler and movable with said feeler into electrical contact with said collar, a contactor ring mounted in said housing and concentric with said post, means in said housing and engageable with said dielectric element, when said slide is in its inner position, to lift said dielectric element to move the tab of a token supported thereon into electrical contact with said ring, to move the center of said token into electrical contact with said post and to move said protuberance into operative engagement with said feeler if in registry therewith, said ring being made up of a series of conductor pads separated by rectifier wafers, a brush carried by said collar to sweep said ring, means for rotating said collar step-by-step to move said brush, at predetermined uniform time intervals from one pad to the next and to turn said collar through one complete revolution in twenty-four hours, and means actuated by said collar once in each complete revolution to advance said rotor through one-seventh of a revolution.

3. Means for reading a discoid, electrically-conductive token having a radially-projecting tab, comprising a support for such a token, said token and said support being provided with cooperating orienting means, a contactor ring mounted above said support and concentrically registering with a token oriented on said support upon a radius corresponding to the location of said tab, means for lifting said token to move its tab into electrical contact with said ring, said ring being made up of a series of conductor pads separated by rectifier wafers, a collar concentric with said ring and mounted for rotation about the axis of said ring, a brush carried by said collar to sweep said ring, and means for rotating said collar step-by-step to move said brush, at predetermined uniform time intervals from one pad to the next and to turn said collar through one complete revolution in twenty-four hours.

4. Means for reading a discoid, electrically-conductive token having an orienting depression in one face, having a protuberance from its opposite face at a point radially spaced from the center of said token and having a radial tab, comprising a support for such a token provided with an orienting projection receivable in said depression, an electrically-conductive post above said support and concentric with said token, a dielectric rotor supported from said post for rotation about the axis of said post, an electrically-conductive collar mounted for rotation, independently of said rotor, about the axis of said post, an electrically conductive feeler reciprocably carried by said rotor at a point radially spaced from said axis by a dimension equal to the spacing of said protuberance from the center of said token and movable, at times, by engagement of said protuberance therewith, contact means carried by said feeler and movable with said feeler into electrical contact with said collar, a contactor ring concentric with said post above said support, means for lifting said token to move the tab thereof into electrical contact with said ring, to move the center of said token into electrical contact with said post and to move said protuberance into operative engagement with said feeler if in registry therewith, said ring being made up of a series of conductor pads separated by rectifier wafers, a brush carried by said collar to sweep said ring, means for rotating said collar step-by-step to move said brush, at predetermined uniform time intervals from one pad to the next and to turn said collar through one complete revolution in twenty-four hours, and means actuated by said collar once in each complete revolution to advance said rotor through one-seventh of a revolution.

5. In a mechanism for reading a discoid token, a housing having a port in an upstanding wall thereof, a substantially horizontal guideway in said housing adjacent said port, a main slide mounted in said guideway, said main slide being formed with a well having an opening through its bottom and being movable between an outer position in which said well is exposed outside said housing and an inner position in which said well is wholly within said housing, a platform member loosely supported from the bottom of said well, having an upwardly-presented surface normally disposed below the mouth of said well and having a shank depending through said opening, the bottom surface of said token and the upwardly-presented surface of said platform member being provided with cooperating orienting means, an auxiliary slide supported from said main slide below the bottom of said well, spring means cooperatively interposed between said auxiliary slide and said housing wall when said main slide is in its inner position and yieldably resisting entrainment of said auxiliary slide with initial movement of said main slide toward its outer position, said platform member shank riding onto said auxiliary slide during such initial movement to elevate said upwardly-presented surface of said platform member into substantially flush relation with said well mouth, cooperating means on said main slide and auxiliary slide engageable after such initial movement to overcome said yieldable means and entrain said auxiliary slide with said main slide, and means disposed in the path of said auxiliary slide during movement of said main slide toward its inner position, to arrest inward movement of said auxiliary slide before said main slide attains its inner position, so that said platform member shank will move off said auxiliary slide.

6. The mechanism of claim 5 including means operatively engaging said main slide and biasing the same toward its outer position, latch means engaging said main slide, when in its inner position, to retain the same in said inner position, and remote controlled means for retracting said latch means.

7. In a mechanism for reading a discoid token having an orienting depression in its bottom surface, a housing having a port in an upstanding wall thereof, a substantially horizontal guideway in said housing adjacent said port, a main slide mounted in said guideway, said main slide being formed with a well having an upwardly-opening mouth smaller than said token and having an opening through its bottom, said main slide being movable between an outer position in which said well is exposed outside said housing and an inner position in which said well is wholly within said housing, a platform member loosely supported from the bottom of said well, having an upwardly-presented surface normally disposed below the mouth of said well and having a shank depending through said opening, an orienting projection upstanding from said upwardly-presented surface of said platform member and proportioned and designed for mating reception in said token depression, an auxiliary slide supported from said main slide below the bottom of said well, spring means cooperatively interposed between said auxiliary slide and said housing wall when said main slide is in its inner position and yieldably resisting entrainment of said auxiliary slide with initial movement of said main slide toward its outer position, said platform member shank riding onto said auxiliary slide during such initial movement to elevate said upwardly-presented surface of said platform member into substantially flush relation with said well mouth, cooperating means on said main slide and auxiliary slide engageable after such initial movement to overcome said yieldable means and entrain said auxiliary slide with said main slide, means disposed in the path of said auxiliary slide during movement of said main slide toward its inner position, to arrest inward movement of said auxiliary slide before said main slide attains its inner position, so that said platform member shank will move off said auxiliary slide, thus withdrawing said orienting projection from said orienting depression, and means for subsequently moving said token off said main slide while said main slide is in its inner position.

8. The mechanism of claim 7 in which said last-named means comprises a lever pivotally mounted on said guideway and having an arm proportioned and designed to sweep across the mouth of said well when said main slide is in its inner position, spring means engaging said lever and normally holding said arm wholly out of the path of said well mouth as said main slide moves between its said positions, and power means operable to overcome said last-named spring means and cause said arm so to sweep said well mouth.

References Cited by the Examiner
UNITED STATES PATENTS

| | | | |
|---|---|---|---|
| 1,795,287 | 3/1931 | Bottome | 194—99 |
| 1,845,919 | 2/1932 | Jones. | |
| 1,941,638 | 1/1934 | Tratsch | 194—97 |
| 2,073,392 | 3/1937 | Knee | 194—4 X |
| 2,276,111 | 3/1942 | Spears. | |
| 2,554,296 | 5/1951 | Crews. | |
| 2,792,148 | 5/1957 | Goldenberg | 194—4 X |
| 2,906,505 | 9/1959 | Orr et al. | 194—4 X |

SAMUEL F. COLEMAN, *Primary Examiner.*